(12) United States Patent
Hallberg et al.

(10) Patent No.: US 9,243,653 B2
(45) Date of Patent: Jan. 26, 2016

(54) VORTEX GENERATOR WITH VORTEX CHAMBER

(75) Inventors: Curt Hallberg, Trelleborg (SE); Morten Ovesen, Malmö (SE)

(73) Assignee: WATRECO IP AB (SE)

( * ) Notice: Subject to any disclaimer, the term of this patent is extended or adjusted under 35 U.S.C. 154(b) by 116 days.

(21) Appl. No.: 13/319,455

(22) PCT Filed: May 8, 2009

(86) PCT No.: PCT/SE2009/050515
§ 371 (c)(1),
(2), (4) Date: Dec. 28, 2011

(87) PCT Pub. No.: WO2010/128915
PCT Pub. Date: Nov. 11, 2010

(65) Prior Publication Data
US 2012/0097280 A1   Apr. 26, 2012

(51) Int. Cl.
| | |
|---|---|
| F15D 1/00 | (2006.01) |
| B01F 5/00 | (2006.01) |
| B01F 5/06 | (2006.01) |
| B01F 13/10 | (2006.01) |
| C02F 1/20 | (2006.01) |
| C02F 1/34 | (2006.01) |
| C02F 1/74 | (2006.01) |
| C02F 103/00 | (2006.01) |
| C02F 103/08 | (2006.01) |

(52) U.S. Cl.
CPC ............ *F15D 1/0015* (2013.01); *B01F 5/0057* (2013.01); *B01F 5/0603* (2013.01); *B01F 13/1013* (2013.01); *B01F 13/1016* (2013.01); *C02F 1/34* (2013.01); *C02F 1/20* (2013.01); *C02F 1/74* (2013.01); *C02F 2103/007* (2013.01); *C02F 2103/008* (2013.01); *C02F 2103/08* (2013.01); *Y10T 137/2087* (2015.04)

(58) Field of Classification Search
CPC .............. F15D 1/0015; B01F 13/1013; B01F 13/1016; B01F 5/0057; C02F 1/34; C02F 2103/08; C02F 1/74; C02F 1/20; C02F 2103/007
USPC .................................... 137/810, 811
See application file for complete search history.

(56) References Cited

U.S. PATENT DOCUMENTS

| | | | | | |
|---|---|---|---|---|---|
| 2,573,192 | A | * | 10/1951 | Fontein | 209/172.5 |
| 2,706,045 | A | * | 4/1955 | Large | 209/732 |
| 2,783,887 | A | * | 3/1957 | Chisholm | 209/150 |

(Continued)

FOREIGN PATENT DOCUMENTS

| | | |
|---|---|---|
| EP | 0834342 | 4/1998 |
| WO | 2008039115 | 4/2008 |

*Primary Examiner* — Eric Keasel
*Assistant Examiner* — Daphne M Barry
(74) *Attorney, Agent, or Firm* — Volpe and Koenig, P.C.

(57) ABSTRACT

A vortex generator intended to create a controlled vortex in a fluid medium such as a gas or liquid. The upstream portion of the vortex generator includes an inlet section which directs the fluid into the vortex generator and creates a vortex therein by use of an internal rotational symmetric cavity with a curved geometry. Downstream from the inlet section is a vortex chamber having one of several shapes in which the vortex motion is established. The vortex generator may have one of two shapes, one being a trumpet shape or elongated, and the other being a more ovide or egg shape. Also included is a cavitation assembly at the outlet portion of the vortex generator which creates cavitation.

4 Claims, 7 Drawing Sheets

(56) References Cited

U.S. PATENT DOCUMENTS

| | | | | |
|---|---|---|---|---|
| 2,816,490 | A | * | 12/1957 | Boadway et al. .......... 210/512.1 |
| 3,288,300 | A | * | 11/1966 | Bouchillon ................ 210/512.1 |
| 3,306,444 | A | * | 2/1967 | Troland ........................ 209/732 |
| 3,501,014 | A | * | 3/1970 | Fitch, Jr. et al. ........... 210/512.1 |
| 3,724,674 | A | * | 4/1973 | Loison ....................... 210/512.1 |
| 4,235,363 | A | * | 11/1980 | Liller ........................... 228/182 |
| 4,259,180 | A | * | 3/1981 | Surakka et al. ............... 209/732 |
| 4,511,474 | A | * | 4/1985 | Krishna et al. ............. 210/512.1 |
| 4,655,923 | A | * | 4/1987 | Leone ........................ 210/512.2 |
| 5,053,082 | A | * | 10/1991 | Flanigan et al. ........... 210/512.1 |
| 5,078,549 | A | * | 1/1992 | Schweiss et al. .............. 209/732 |
| 5,139,652 | A | * | 8/1992 | LeBlanc ....................... 209/733 |
| 7,234,489 | B2 | * | 6/2007 | Bowe et al. .................... 137/813 |
| 7,293,657 | B1 | | 11/2007 | Kelton et al. |

\* cited by examiner

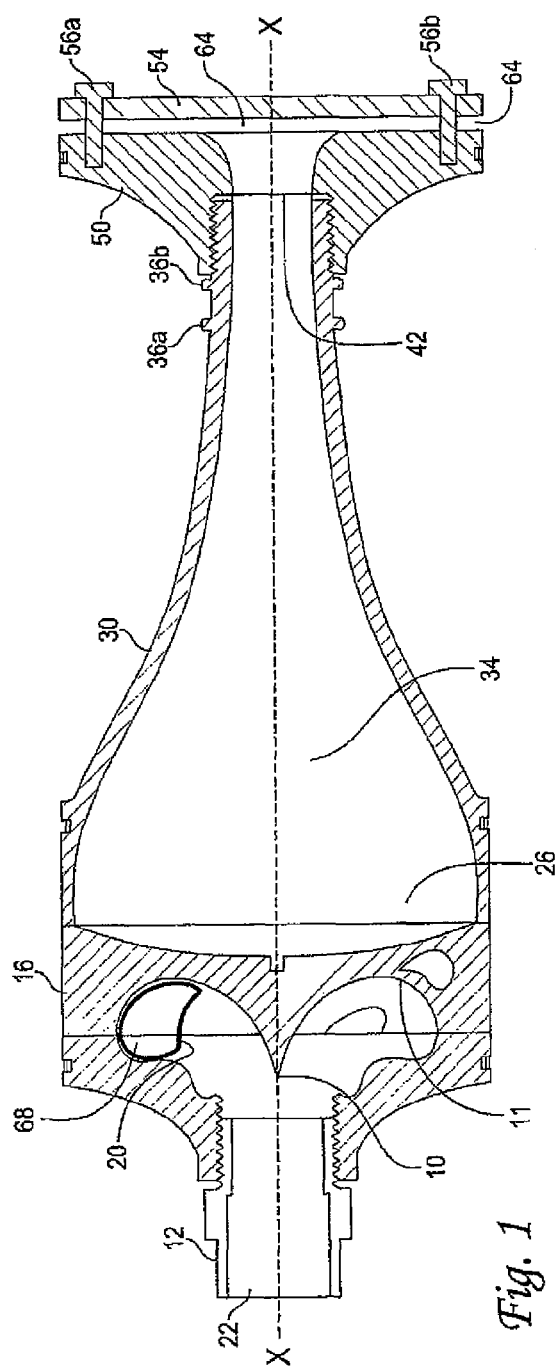
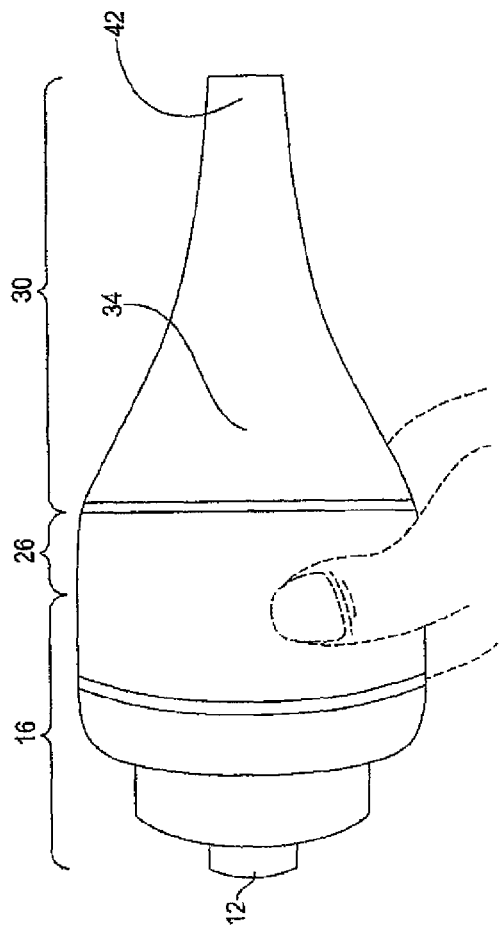

VORTEX GENERATOR WITH VORTEX CHAMBER

FIELD OF THE INVENTION

This disclosure relates to vortex generators.

BACKGROUND

Vortex generators are well known; they bring a fluid medium into a controlled vortex motion. See commonly invented PCT Publication WO 2008/039115A1 "Vortex Generator" useful e.g. for purifying water or other fluids, degassing a liquid, mixing fluids or a solid and a liquid, and killing microorganisms in a liquid, and incorporated herein by reference in its entirety.

SUMMARY

The present vortex generators represent improvements and modifications to that of WO 2008/039115A1. They bear some similarities to the devices shown in that publication. However embodiments disclosed here have different configurations and modes of operation, which have been found to enhance the vortex generation effect. Also disclosed here are methods of using the present vortex generators for, e.g., water purification, fluid degassing and particle de-ionizing and separation, flocculation, and pumping of liquids.

Also disclosed herein is a cavitation assembly for use with a vortex generator intended to induce cavitation at the outlet of the vortex generator in a fluid, such as a liquid, for the purposes of for instance sterilizing a liquid by killing microorganisms present therein due to the cavitation.

BRIEF DESCRIPTION OF THE FIGURES

FIG. 1 shows a cross-sectional view of the present vortex generator.

FIG. 2 shows an outside view of the present vortex generator.

DETAILED DESCRIPTION

Figure 3A:
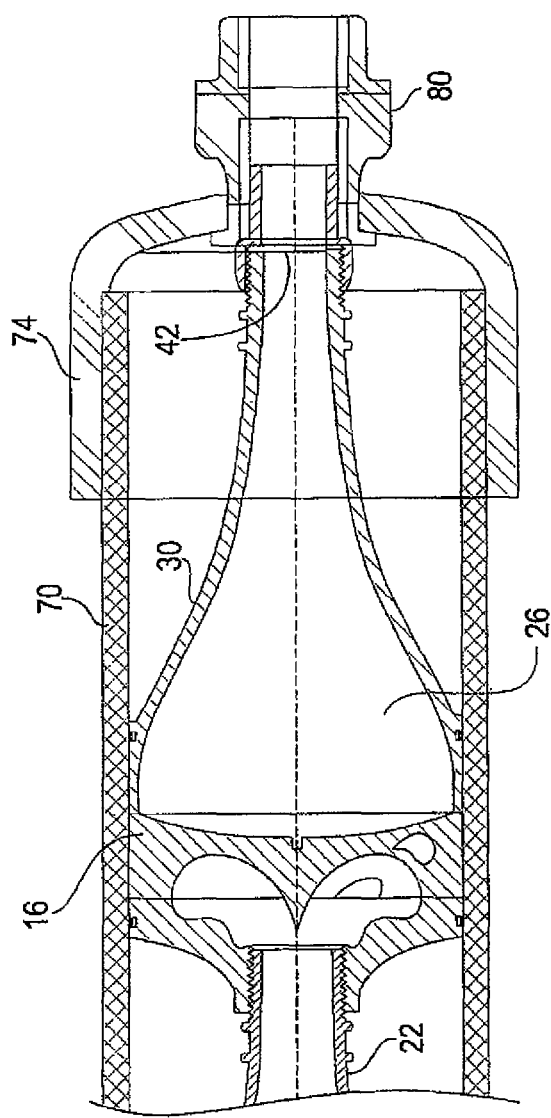
FIG. 3A shows the vortex generator of FIG. 1 together with a housing and outlet attachment.

Vortex Generator with Trumpet Shaped Vortex Chamber

FIG. 1 shows an example of the present vortex generator having a trumpet shaped vortex chamber and with an attached cavitation assembly. This view is a cross-sectional view. It is to be appreciated that the device is symmetric about axis x-x. The chief components as shown here are an inlet tube 12 which is optional and is shown as being threaded and introduced into a threaded portion of the upper portion 16 of the vortex generator, also referred to as an inlet portion or inlet section. This inlet section defines in its interior by a sharp top 10 meeting the incoming fluid followed by a bent surface 11, which, at sufficient pressure and flow cause a torus shaped vortex in the fluid below the opening 22. There is also a set of conical spiral shaped channels 20, explained in further detail below. The inlet portion 16 is in fluid communication with a connector section or portion 26, explained in further detail below. Immediately downstream of the connector portion 26 is the interior of the vortex chamber 30, which in this case is defined as being trumpet shaped in its lengthwise cross section and having an interior 34.

Defined on the outside of the vortex generator are a set of reinforcing ribs intended for strengthening shown generally at 36a, 36b. The number and disposition of such ribs is a design choice and depends on the materials and internal fluid pressures. The lower portion of the vortex chamber 30 defines an outlet portion 42 through which the fluid flows outwardly. It is to be understood that the fluid flows generally along the x-x axis from right to left in the figure. Of course this particular orientation of the device is merely for purposes of illustration and the device will operate in any orientation since it is not gravity dependent. In this case attached to the outlet portion 42 is a cavitation assembly, including a holder portion 50 which defines a set of internal threads which mate with threads on the external portion of the end of the vortex chamber, a cavitation plate 54, and two members (e.g., screws or pins) 56a, 56b which attach the plate to the holder. As explained below that there are actually typically three or more such attachment screws or pins; but only two are visible in this cross section. This cavitation assembly defines a space 64 between the opposing surfaces of the holder portion 50 and the cavitation plate 54. Operation of this cavitation assembly is explained below. It is to be understood that in certain embodiments no such cavitation assembly present since this cavitation assembly is only used when cavitation is desired. In most applications of this vortex generator there is no need for cavitation.

Generally construction and operational detail of this vortex generator (except for the cavitation assembly) are as shown and described in the above cited international patent application. This is specifically the so-called trumpet shaped embodiment shown in FIG. 1 of that patent application. However the present vortex generator as shown here does not include the vortex concentrator portion. Also the present vortex generator of FIG. 1 does include the connector portion 26, which has a particular configuration and properties as described hereinafter and is not disclosed in the above cited international patent application.

FIG. 2 shows the exterior of the device of FIG. 1 and for a vortex generator with a diameter of 122 mm gives an approximate idea of its relative size in one embodiment as being somewhat larger than a human hand holding the device. FIG. 2 shows a better depiction of the shape of the device. Like portions of FIG. 2 carry the same reference numbers as in FIG. 1. Also shown in FIG. 2 is the inlet portion 16 extending as shown from the inlet pipe 22 down to the connector portion 26. Note that no cavitation assembly is present in this embodiment. In this embodiment, the overall length of the vortex generator is approximately 280 mm when the diameter is 122 mm. Of course dimensions given here are merely exemplary and the relations between the dimensions are further explained below. Generally the inlet portion 16 and the vortex chamber 30 here are similar to those disclosed in the above cited international patent application, differences being here the connector region 26 and the (optional) cavitation assembly.

FIG. 3A shows a vortex generator somewhat similar to that of FIG. 1, but without the cavitation assembly and with the vortex generator mounted inside a housing 70. In this case, the housing 70 also includes an outer connection fitting 74 at the lower end of the vortex chamber to which is coupled a downstream connector 80 for coupling for instance to a second vortex generator or perhaps to an outlet. It is appreciated that the housing 70 may be made of any suitable material and is chiefly for purposes of protection from, for instance, the weather. In this case the connector 80 is to other types of fluid connectors such as pipes or tubing (not shown).

Figure 3B:
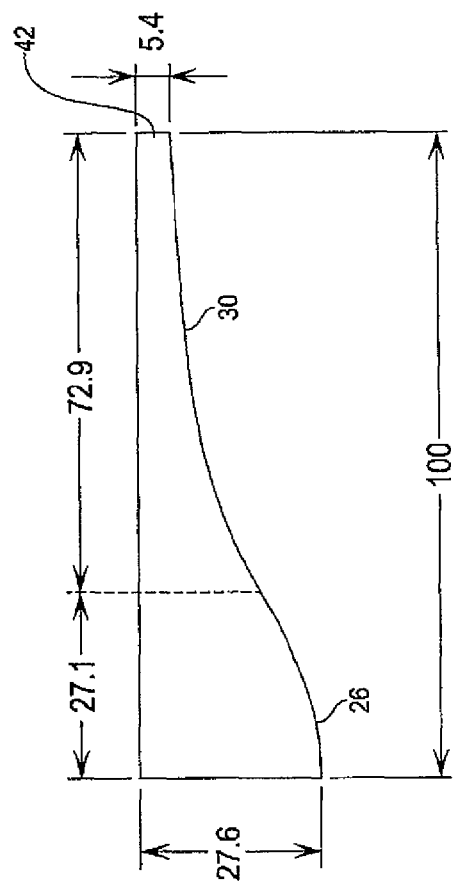
FIG. 3B shows the profile of the vortex chamber of the FIG. 1 device.

FIG. 3B shows in cross section the curve that defines the inner surface of the connector region 26 and the vortex chamber 30. In this application the connector region replaces the rounded recess 98 in FIG. 6 in the above cited international application. Dimensions in millimeters are shown for an exemplary embodiment. This shows how the connector portion 26 at its left most end (adjacent to the inlet section) defines a cylindrical cross section with a diameter that is about 3% smaller than the diameter of the inlet section, and then tapers to connect to the trumpet shaped vortex generator inner surface 30.

The longitudinal section of the inner surface of the trumpet shaped vortex chamber 30 is defined by the algebraic function $f(x)=k*x^y$ where: x is a variable defined along the length of the vortex chamber, $8500<=k<=9000$, $-1.1<=y<=-1.0$ and the function is defined between values x0 and x0+250 and x0 can be: $70<=x0<=170$. A typical unit for variable x is mm, but can be any length unit or fraction thereof.

Figure 4:
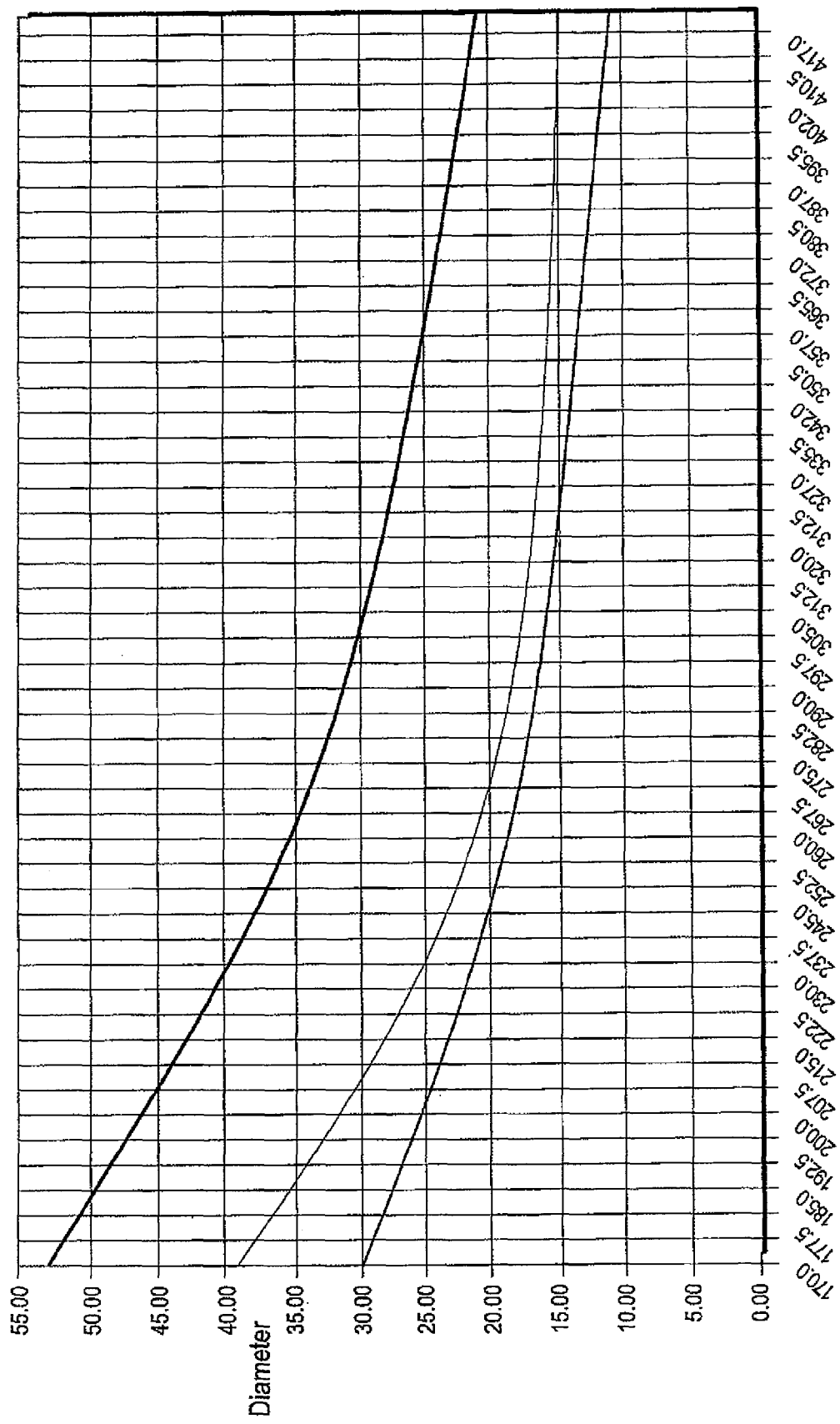
FIG. 4 shows in graphical form the inner shape of the vortex chamber of the FIG. 1 device.

This function gives a "window" for the shape of the vortex chamber and is depicted in the graph of FIG. 4 which shows the window and where the range for the vortex chamber shape is between the upper limit (upper curve in the graph) which has the following parameters: k=9000; y=-1,0 and x0=170 and the lower limit (lower curve in the graph) which has the following parameters: k=8500; y=-1.1 and x0=170. An exemplary shape (middle curve in the graph) is defined by the following parameters: k=8662; x0=170, and where y varies as: $-1.0856<=y<=-1.05$ along the x-x axis. However, FIG. 4 does not show the whole window defined by the equation and the parameters in the above cited international application.

The connector section or region 26 between the trumpet shaped vortex chamber 30 and the inlet portion 16 has the function of smoothly changing the direction of the fluid from the inlet portion towards the vortex chamber. Therefore its inner surface has a cylindrical shape (straight sides) closest to the inlet portion in order to meet the incoming fluid. The inner surface at the portion of the cylindrical shape distal from the inlet portion curves smoothly until its tangent reaches a 31 degree angle to the x-x axis, where it meets the curve of the inner surface of the trumpet shaped vortex chamber at e.g. about 143 length units (variable x above).

The following is a detailed description of the spiral shaped conic channels (e.g., their specific dimensions and ranges in one embodiment.). This configuration of the conic channels is well known in the field and is similar here to what is described in the above cited international application. See present FIG. 5A which depicts how the shape of these channels is generated. The actual "egg" shape of the conic channels can be derived from the hyperbolic formula $f(x)=1/x$. If the curve from x=1 to x=3 is rotated around the x axis a hyperbolic funnel or cone is generated, as shown graphically along the x-y axes in FIG. 5B. Now if a 45 degree cut is made in the cone as in FIG. 5B, where x=2, an egg-like cut section appears as in FIG. 5A at 1. The geometry of the egg-like cut section is used for the cut section in the conic channels.

Figure 5A:
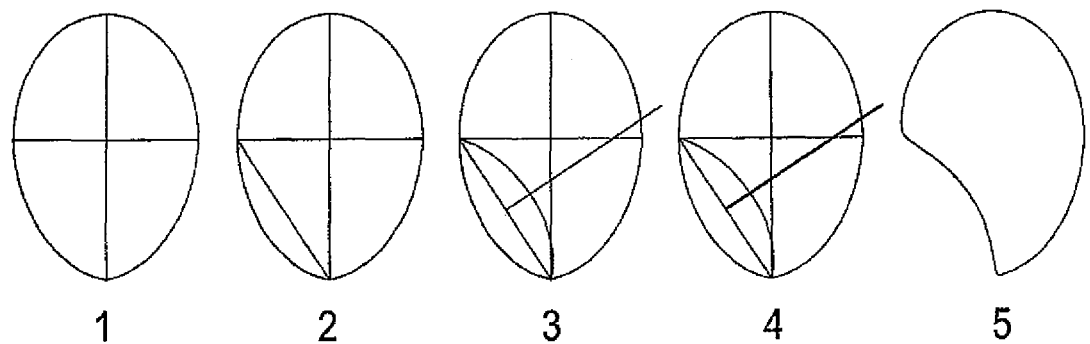
FIG. 5A shows the configuration of the conical shaped channels in the inlet portion of the FIG. 1 vortex chamber.
Figure 5B:
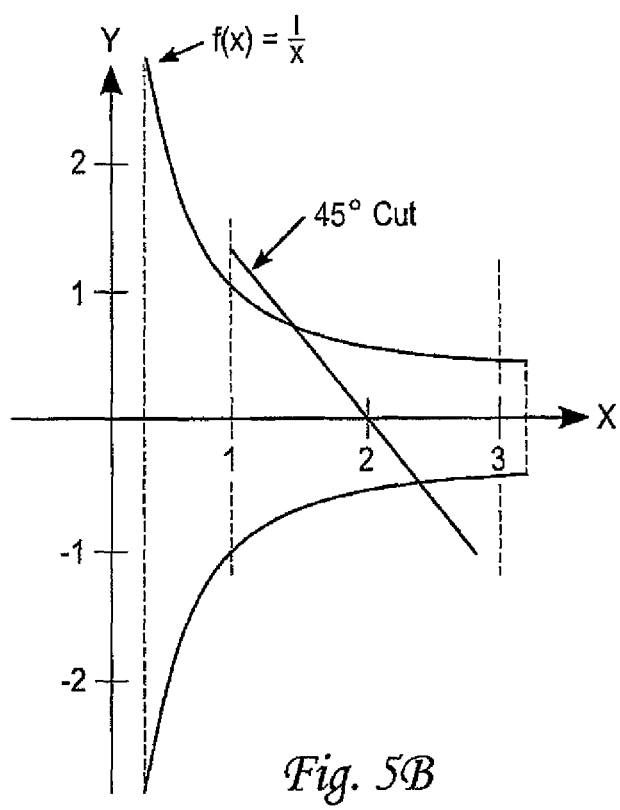
FIG. 5B shows detail of the structure resulting from FIG. 5A, graphically.

The design of the indentation thus is a five step process as shown in FIG. 5A. Using the egg shape deriving from the hyperbolic cone 1, draw a mirror line from the left periphery to the bottom end of the egg at 2. Mirror the egg line of the left lower quadrant in the mirror line at 3 and make a new mirror line as a normal to the first mirror line and placed with one end at the midpoint of the first mirror line. Mirror the mirrored line one more time i.e. invert it at 4. Erase all "help lines" and fillet (smooth) the sharp corners 5. The "profile" of the cut section is adapted and placed into the inlet portion at point 68 in FIG. 1. The height of the egg is such that it fits inside the torus shaped cavity inside the inlet portion 16.

The "profile" is then swept along a path that follows a hyperbolic function and declines around 25 length units in the horizontal plane. Normally the swept angle is 72 degrees since five conical channels are used (since 360 degrees/5=72 degrees).

In the vertical plane the path also shapes a hyperbolic curve that is bent slightly inwards from a radius of about 58 length units (e.g., mm) to a narrower radius of about 55 mm for a 122 mm diameter inlet portion. The conical channels are designed as being an "egg" with an indented cut section, described above, which is swept along a path that forms a hyperbolic curve in both the horizontal and the vertical plane. The sweep is (normally) 72 degrees. The profile is rotated (outwards) 90 degrees during the sweep. The area of the cut section is decreasing (making it conical) by a factor of 0.6 following the same hyperbolic function as earlier.

Figure 6:
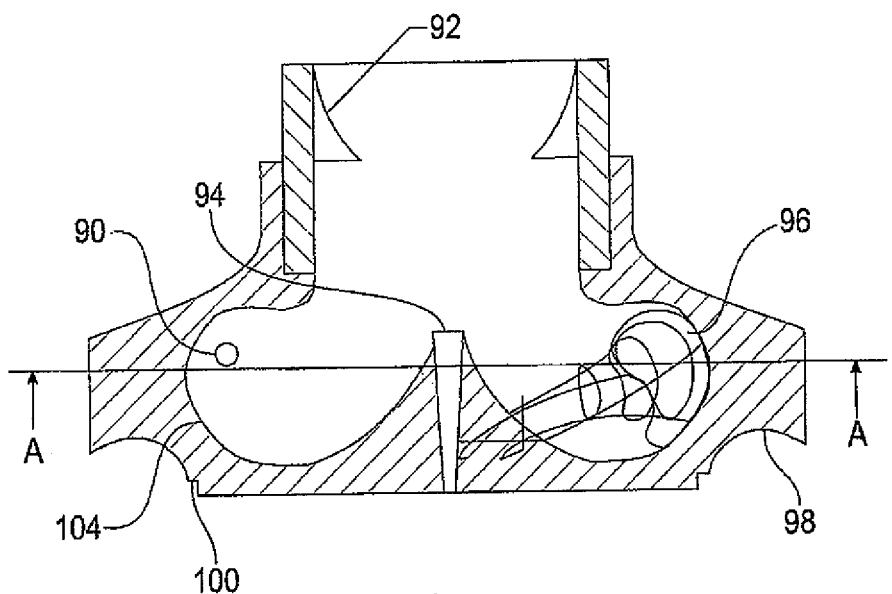
FIG. 6 shows the inlet portion of the FIG. 1 device.
Figure 7:
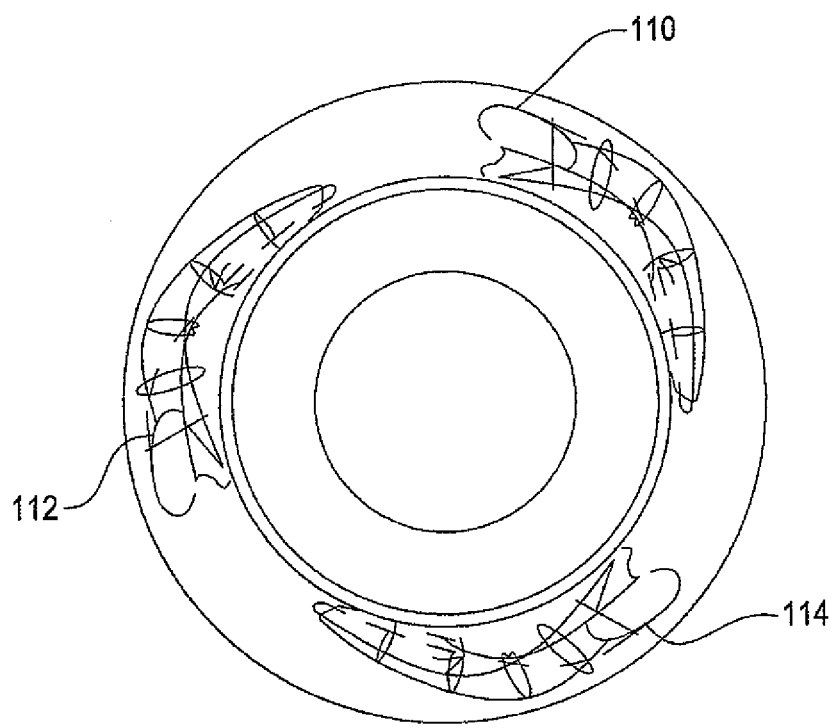
FIG. 7 shows a cross section of the inlet portion in a top view.

FIG. 6 shows details of the inlet section 16 and is identical to FIG. 4 of the above cited international application. It includes the rotationally symmetric cavity 90, the internal wing portion 92, the central channel 94, channel 96, the rounded recess of the outer portion of the inlet section 98, a beveled edge 100 and the internal curved geometry 104. Associated FIG. 7 shows the inlet portion along the cross section A-A of FIG. 6 and includes the spiral shaped conic channels 110, 112 and 114.

The vortex chamber configuration depends on its purpose. In high fluid flow or for conditioning purposes a more elongated version is preferred as in FIG. 1, but for a spraying function or when a fine distribution of the ejected jet is needed a more egg shaped geometry is preferred as described below. The geometry of the vortex chamber controls the acceleration of the rotational speed (the gear factor). Here it is important to maintain the peripherical speed and only let the angular speed increase as the diameter of the vortex chamber decreases. The inner geometry of the cross section allows control of the acceleration of the rotational speed so that the same peripheral speed of the vortex is maintained.

The gear factor, i.e. the ratio between the diameter of the connector portion 26 compared to the diameter of the outlet end 42 of the vortex chamber, preferably is as large as possible in order to maintain the "pirouette effect". However, the radius at the outlet end 42 should not be so small that the area of the outlet end is smaller than the accumulated area of the conic channels directly at the bottom of the inlet portion.

The structure of the vortex generator may be of any suitable material(s), usually plastic or metal. The vortex generator may be conventionally cast or molded in one or several components, or machined in one or several components, and if formed of several components the components may be joined together by any suitable process such as welding, adhesives, or fasteners. Suitable materials for the interior surfaces of the vortex generator are hydrophilic materials as titanium dioxide (Anastase) doped with tungsten III oxide mixed in epoxy (or other resins) or other plastics that have a high dielectricity constant. Copper, gold or silver can also be plated to the inside of the vortex chamber.

For operation of the vortex chamber, an important parameter is the speed of the fluid—gas or liquid—that is injected into the vortex chamber. This speed must have a certain value in order to obtain the vortex effect.

The following shows exemplary dimensions for one embodiment of the vortex generator of FIG. 1:

| | |
|---|---|
| Diameter of nozzle or inlet portion 16 | 122 mm |
| Cone outlet area | 393 mm$^2$ |
| Conic channel area | 78.6 mm$^2$ |
| Circumference | 339.29 mm |
| Outer diameter cone | 122 mm |
| Diameter cone outlet | 22.3 mm |
| Gear factor | 5.47 |

Note that the dimensions above only show one size. The most important dimension is the diameter of the nozzle. If the diameter of the nozzle is altered all other dimensions are scaled so that the proportion between the dimensions is kept.

The following table shows relevant pressures, flow rates, and speed of revolution (revolutions per second, rps, for this example:

| Pressure (Bar) | Flow (l/h) | General flow l/s | Flow in conical channel l/s | Speed fluid (mm/s) | rps (in cone) | rps (out of cone) |
|---|---|---|---|---|---|---|
| 0.5 | 1012 | 0.28120 | 0.05624 | 715.52 | 2.11 | 11.54 |
| 1 | 2835 | 0.78740 | 0.15748 | 2003.57 | 5.91 | 32.31 |
| 1.5 | 3508 | 0.97437 | 0.19487 | 2479.32 | 7.31 | 39.98 |
| 2 | 4077 | 1.13237 | 0.22647 | 2881.36 | 8.49 | 46.46 |
| 2.5 | 4601 | 1.27796 | 0.25559 | 3251.79 | 9.58 | 52.43 |
| 3 | 4830 | 1.34174 | 0.26835 | 3414.10 | 10.06 | 55.05 |
| 3.5 | 5106 | 1.41844 | 0.28369 | 3609.26 | 10.64 | 58.20 |
| 4 | 5722 | 1.58957 | 0.31791 | 4044.71 | 11.92 | 65.22 |

In this table a theoretical calculation of the rotational speed in the connector portion 26 has been derived from the dimensions of the vortex generator and measurements of the flow through a system having three such vortex generators fluidly coupled in series with the fluid being water. Testing indicates that a vortex rotational speed of below 2 rps (1000 l/h) is too low. However, a vortex rotational speed of 6 rps (about 2800 l/h) has proven efficient for treatment purposes. Therefore the flow and pressure of the vortex generator in some embodiments should be such that the rotational speed inside the vortex chamber is greater than 6 rps but in other embodiments the rotational speed can be as low as 2 rps.

Cavitation Assembly

In some embodiments (e.g., that of FIG. 1) the vortex generator is used in conjunction with the illustrated cavitation assembly. The resulting cavitation kills microorganisms present in the fluid. The cavitation assembly generates the actual cavitation between the plate 54 and the holder 50. Cavitation is a well known phenomenon in fluids involving the formation of vapor bubbles of a flowing liquid where the pressure of the liquid falls below its vapor pressure. It is often an undesirable effect, such as when caused by a pump or propeller. Cavitation causes very strong shock waves which can be destructive of moving parts. In the present device, the cavitation shock waves are used to kill microorganisms such as bacteria present in a liquid such as water. The present cavitation assembly uses hydrodynamic cavitation which is produced by passing a liquid through a constricted channel at a specific velocity. Cavitating water purification devices are well known to break down pollutants.

In the present cavitation assembly, the holder 50 is shaped similar to the top part of the inlet section 16. Its internal cavity is altered so that the outlet 42 from the vortex chamber 30 continues into a smooth opening. The holder 50 can be made of the same material as the inlet section; such as polyurethane, polypropylene, epoxy or similar plastics. The plate 54 may be made of a more robust material as polycarbonate plastics (e.g., Lexan or Macrolone). For even more robust operation various metals may be used. Preferable are copper or copper alloys. The inner edge of the plate 54 is preferably well rounded. In some embodiments the holder is fabricated as part of the vortex chamber rather than as a separate component.

The plate 54 is mounted to the holder 50 with 3 suitable machine screws (or pins) 56a, 56b so that a distance is kept between the plate and the holder. When the water flows out from the vortex chamber, a sub pressure will be applied between the plate 54 and the holder 50 and the plate will move towards the holder. However, if the distance is too small the pressure will increase. This means that the plate will slide up and down on the screws maintaining a certain distance at 64 that is self regulated by the pressure. When the fluid moves towards the periphery of the plate the sub pressure will be so low so that the fluid "rips" apart and starts to cavitate. This cavitation zone is located approximately in the central third of the plate at 64, and forms the "killing zone" for the microorganisms. The diameter of the plate 54 preferably is such that the outlet area at the edges of area 64 where the cavitated fluid flows out is equal or bigger to than the outlet area 42.

Figure 9:
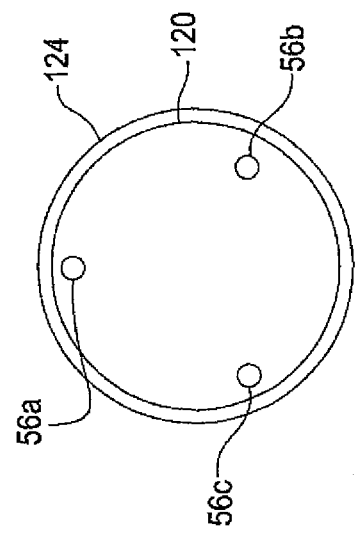
FIG. 9 shows detail of the cavitation plate of the FIG. 1 device.

FIG. 9 shows in an end view the cavitation plate 120 and the holder 124 and the heads of the three machine screws or other fasteners 56a, 56b, 56c, similar to what is shown in FIG. 1.

Figure 8:
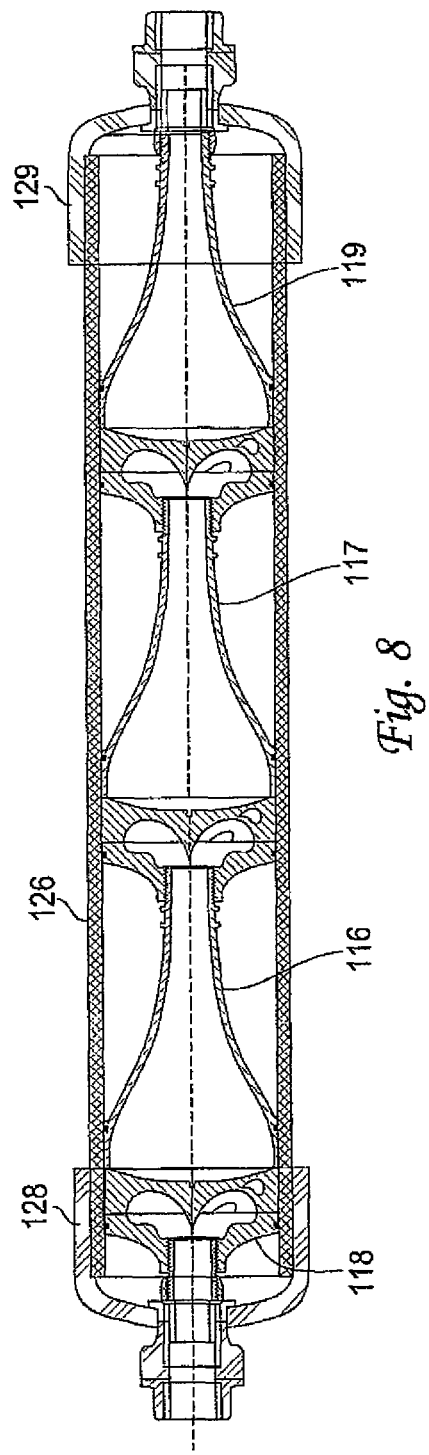
FIG. 8 shows an apparatus including three of the FIG. 1 devices coupled in series.

FIG. 8 shows in lengthwise cross section an apparatus including three of the FIG. 1 type vortex generators fluidly coupled in series. This is suitable for, e.g. water purification where a greater degree of purification is needed than provided by one vortex generator. The apparatus includes three vortex generators 116, 117, 119 coupled (screwed) in series end-to-end, allowing any kind of other device to be connected between one vortex generator and the next. Each vortex generator includes as in FIG. 1 an inlet portion, connector portion, and vortex chamber; for example, the inlet portion of vortex generator 118 is at 118. A cylindrical housing 126 is provided in which the three vortex generators are suitably mounted and which is of e.g. plastic or metal to provide suitable protection. Fluid couplings 128, 129 at either end of the apparatus include in this embodiment pipe fittings to couple respectively the incoming fluid to the first vortex generator 116 and the last vortex generator 119. Of course selection here of three vortex generators is a design choice; there may be two or four or more vortex generators in such an apparatus.

Figure 10:
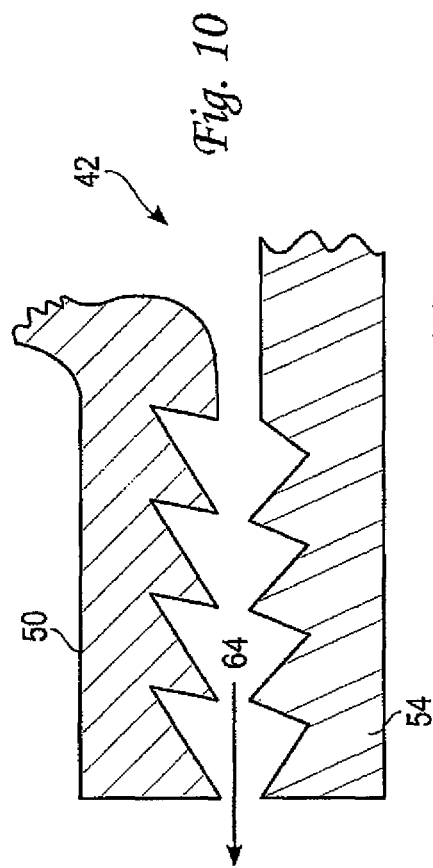
FIG. 10 shows detail of the cavitation plate.

FIG. 10 shows detail of the outer portions of the holder 50 and the opposing cavitation plate 54. The central channel or outlet portion 42 is as indicated. Note that this only shows a portion of the plate and holder and without the fasteners (screws) for simplicity. The key factor here is that the opposing surfaces of the plate and holder define a series of sawtooths or steps. It has been found that this enhances the cavitation effect. The arrow indicates the direction in which the fluid disperses out of the intervening area 64.

The vortex generator with the cavitation assembly is preferably used with a standard tubing or piping system to provide and accept the fluid. This apparatus can be used in tanks, ponds or any other open water surface. The system needs a relatively high pressure and flow to work efficiently. If the system is used in more demanding applications the whole system may be made of stainless steel. It is also possible to provide a system of many cavitation units connected to a central pump. This is used for instance in ballast tanks on ships but also in larger ponds. The system is normally meant for processing water but can also be used with other fluids. When the vacuum bubbles implode the cavitation energy "cracks" bigger molecules. As the vortex process depends on a smooth flow the viscosity of the fluid needs to be in the same range as water. The cavitation unit can also be used as very efficient air/gas mixer. If air is introduced in the water stream before reaching the vortex generator, the air bubbles are broken down to very small bubbles by the cavitation implosions. This creates a cloud of fine bubbles in the water, something that gives a huge surface area where the oxygen in the air can pass over to the water. Inside the vortex chamber particles in the liquid tend to agglutinate and the fine bubbles float the particles and create a froth or particles on the surface which can easily be separated or skimmed from the surface.

Vortex Generator with Egg Shaped Vortex Chamber

Figure 11:
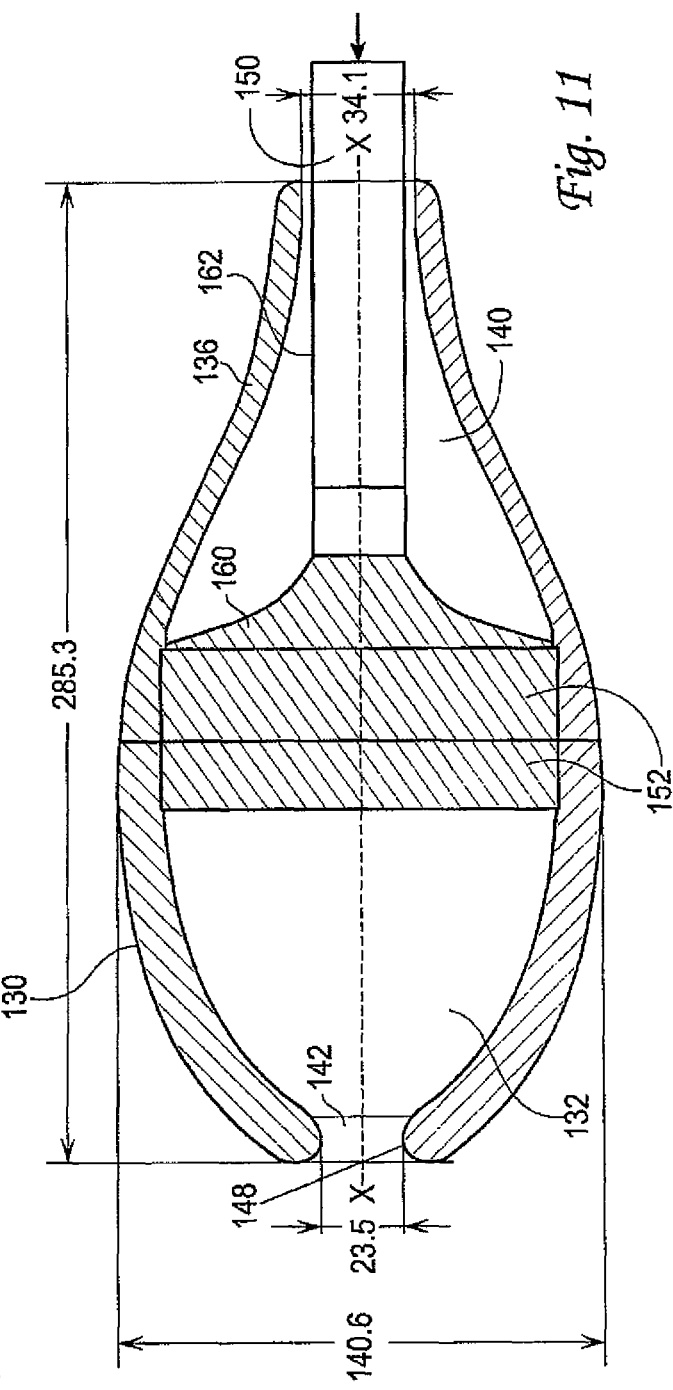
FIG. 11 shows in cross section the present egg-shaped vortex chamber type of vortex generator.

An alternative shape of the vortex chamber of a vortex generator is illustrated in the above cited international patent application in FIG. 2, having a more bulbous or "egg" shape. The vortex chamber follows equation 4b of that international application. This is also the case with its outer geometry but this is elongated by a factor of 1.2 in the x-x direction. The following discloses a variant of that apparatus also with an egg shaped vortex chamber but configured and used differently. In this case the vortex chamber is directly fitted to the inlet portion and the connector portion 26 is not needed. In this particular vortex generator, the water or other liquid or fluid enters from the small end of the egg shaped vortex chamber (see FIG. 11 showing exemplary dimensions for one example) and exits at the outlet at the larger end of the egg shaped vortex chamber (to the left in FIG. 11.) The present vortex generator as shown in cross section in FIG. 11 is rotationally symmetric about axis x-x and has two parts or regions, a vortex chamber (downstream) section 130 (to the left) defining an interior 132 and an (upstream) section 136 (to the right) defining an interior 140.

The interior 132 is the actual vortex chamber and is shaped like the sharper end of an egg. Since the structure of this part is rather thick (to provide strength) an equally thick "lip" 148 is present surrounding the fluid outlet 142. The edge radius of the "lip" is in one embodiment 7.2 mm. However, both the lip size and the diameter of the outlet 142 and the other illustrated dimensions (in mm) are selected according to the maximum sub pressure according the actual depth in the fluid of the egg, and flow and pressure of the incoming fluid. In the centre of the vortex generator a seat 152 is located in the walls of the apparatus for holding a nozzle 160 (same as the inlet portion 16 in FIG. 1) located between the two sections 130, 136, see FIG. 11. As shown the elongated egg shape is maintained well past (to the right of) the nozzle seat 152, where the shape tapers out so it can connect at the opening 150 with e.g. a tube 162 from a pump (not shown) which pumps the liquid into the vortex generator in the direction shown by the arrow at 150. Tube 162 is inserted and screwed to the nozzle 160 located in its seat 152. Hence the shape of interior region 140 is of no particular importance since the incoming fluid is confined to the tube 162. In one embodiment the two sections 130, 136 are made separately and connected together with multiple fasteners (not shown) so that the system can be, when in use, separated and cleaned. Suitable materials are the same as for the FIG. 1 vortex generator.

This vortex generator with the egg shaped vortex chamber is especially intended for algae control and purification in a pond. Here the vortex inside the vortex chamber generates a sub pressure that sucks in air from the atmosphere through a hose that is connected to the central canal 94 (FIG. 6) in the inlet portion. If the incoming air is reduced the sub pressure in the vortex chamber decreases, forcing, at the same time, a stream of water from the pond to be sucked in through the outlet 142. This water stream starts to rotate along the same direction as the outgoing vortex from the vortex generator so that an in-going vortex is generated. The air is "ground" between the two water streams and very small bubbles float out together with the outgoing vortex. If the apparatus is run with a higher flow and pressure it can be used for cavitation purposes as well. As the water in the vortex floats over the lip 148 at outlet 142, the lip and the adjacent area just outside of the outlet 142 act like an airfoil. This generates a sub pressure that bends the direction of the flow of the water so it goes backwards. This water also applies a sub pressure to the surrounding water and water up to a radius of about 1 m will be sucked into the flowing water. This makes this apparatus a very effective pump that moves approximately 20 times more water than is pumped through the vortex generator of the above cited international patent application. For pond and aquaculture purposes this is very effective in order to control algae growth and to aerate the water. The circulation effect is a good agent for pond water destratification.

The same effect as described above works when the fluid is a gas instead of a liquid. Also here the direction of the gas stream bends and goes backwards. The same subpressure acts on the surrounding media so it moves along the gas stream. In the same way a subpressure inside the gas vortex is generated and it is possible to suck in a liquid and effectively spread it out in the surrounding air as a fine aerosol.

Uses of the Vortex Generators

In a ballast water tank or where there is a need for heavy aeration a system using a vortex generator with the egg shaped vortex chamber and a vortex generator with the cavitation assembly can be used where the cavitation assembly is fed with air, as described above, and provides the major part of the aeration and the vortex generator with the egg shaped vortex chamber circulates the water in the tank or pond. If the water has many particles or algae the combined system can be run in two operational modes where the system first runs quite hard (in terms of incoming water pressure and flow rate) generating flotation. After a while the system goes into aeration mode and less energy is needed to drive the fluid.

The vortex generator with the egg shaped vortex chamber can also be used in waste water plants, for aeration and also for breaking down froth and bubbles. In most waste water treatment plants a sedimentation process is used in the first step. Very often bubbles create a problem since fermentation generates bubbles which destroy the sedimentation process. If the vortex generator is placed at the centre of a large open vessel that has its upper rim just below the surface, a current of water can be sucked from the surface. Inside the vessel a bigger vortex will form pulling the bubbles in to the water. When the bubbles enter in the water they will be broken up and mixed with the water.

The circulation properties of the vortex generator with the egg shaped vortex chamber can be used for pumping purposes or as a propulsion device. The whole system can be built with a fluid pump integrated. This also allows a "stand alone system" without an external pump.

Sea or river or lake or pond or well water (and even much already treated drinking water) contains many dissolved substances and various types of gases, most common air. The present vortex generators can be used to purify such water. The content of air is mostly in the shape of very small bubbles (nanobubbles). These bubbles are very "sticky" and interact with, each other, the walls of any surrounding pipe or vessel and with other particles. Around every bubble there is a zone of highly organised water that has a higher viscosity compared to the bulk water. When the vortex inside the vortex chamber is generated a powerful sub pressure (almost a vacuum) is also generated. The Archimedes principle also concerns small bubbles and they "float" towards the centre of the vortex. As they come nearer they expand as the pressure drops and they also combine with each other. After a while a string of gas with a low pressure is gathered in the centre of the vortex. The air trapped inside the vortex follows the flowing water and releases out side, the water is degassed.

The result is that the viscosity of the water is lowered as the bubbles disappear. The degassed water has the same properties as when the water has been heated. The water floats better on ice (such as on an ice rink, for resurfacing the ice surface) and penetrates pores and cracks in the ice much better. As the water contains lesser bubbles that acts as isolation the heat transports better through the ice and lesser energy is needed to keep the ice cool. The same effects can be found while watering a soil that is repelling water (a non-porous soil, for agricultural purposes.) In this case the treated water penetrates the soil better and there is no need for wettening agents i.e. detergents. Besides the use for irrigation applications the better penetration parameters can be used for mining applications as dust control or to improve infiltration of a dump or heap leach pad. Such degassed water is also superior for making concrete since it improves the floating properties and strength of the concrete.

The present vortex generators can be used to separate particles from a liquid such as water using the well known effect when particles in water are rotated with the water in a circular vessel. In this case mainly two forces act on the particles. First there is the inertia force that pushes the particles at the direction of the tangent to the flow. The other force is centripetal force that derives from the walls of the vessel, forcing the water and the particles to alter the direction at every moment. As long as the particles are in the bulk water the forces are balanced and they just circulate. However, near the bottom a boundary layer of still water exists. When the particles touch that layer their speed decreases which lowers the inertia forces. But, the forces from the walls are still present and the particles moves towards the centre. The present method utilises this effect but in 3 dimensions.

Note that dissolved metal ions in water can be separated similarly using the present vortex generators. Solitaire metal ions are positive, such as $Fe^{3+}$, and they easily move in an electrical field. Such a field is generated inside plastic tubes as the flowing water rubs against the walls of the plastic tubes. Due to the resulting friction, electrons are "ripped" off and disappear with the water. This gives a positive electrical field inside the tube. Since the metal ions are positive they are repelled from the positive surface towards where the field is weakest, in the centre. Here in the vortex generator the vortex flow takes over and moves the metal ions to the fluid outlet of the vortex chamber. The purified water is separated coaxially from the reject water where a tube, connected to a sub pressure, sucks the reject water out from the purified water.

Another useful effect of the present vortex generators is flocculation. What happens inside the vortex generator is the same thing that happens in a river or a small creek. The hydrodynamic effect of the vortex operates in combination with the powerful oxygenation makes algae spores and other particles present in the liquid break down to smaller structures or oxidizes into other substances. Due to the friction with the vortex chamber walls and other particles the electrical properties alter as well. The particles will build up (flocculate) into bigger and coherent "cakes". The particles come nearer to each other and build bigger units when they are vorticed together. This is because differences in rotational speed between one rotating layer that has a slightly bigger radius and the next layer. In the reality there are no separated layers but more like a spiralized movement along the axis towards the smaller outlet. When the layer with the slightly smaller radius has a higher rotational speed the boundary layer between the layers will have small vortices that rotate towards the bigger layer and twist the particles together. The "cakes" or units move to the centre of the vortex and float out along with the water. The result is "cakes" that float on the surface of the body of water such as a pond, to clean the pond of contaminants.

A similar phenomenon can be observed if e.g. pond water with a high content of iron is processed by the vortex generator. If air is added an orange froth is the result, where the orange colour is oxidised iron. If the "cakes" are allowed to sink to the bottom of the body of water they will start to decompose. As the oxygen is kept at a high level by the vortex, the microbiologic activity is maintained. The organic material is decomposed and returns to the aquatic life in the pond. The result is a healthier and more attractive pond. However, the "cakes" or the froth can be skimmed of the surface by using a similar method as when to decompose bubbles and froth in waste water plants. Another way is to use the above described particle separation effect but on a bigger scale.

This disclosure is illustrative and not limiting; further modifications and enhancements will be apparent to those skilled in the art in light of this disclosure to those skilled in the art and are intended to fall within the scope of the appended claims.

We claim:

1. A vortex generator comprising:
   an inlet portion coupled to receive a fluid and which generates a vortex in the fluid;
   a vortex chamber in fluid communication with the inlet portion and being shaped as the sharper half of an egg in its lengthwise inner cross-section, and having a seat in the vortex chamber at the widest portion of said vortex chamber, wherein the inlet portion is mounted in said seat;
   an outlet for the fluid defined as a through hole in the wall of the vortex chamber at an end of the vortex chamber distal from the inlet portion, said end being the sharper end of said egg shape:
   wherein the outlet defines a lip portion; and
   wherein in operation of the vortex generator the lip portion generates a sub pressure on the fluid, thereby redirecting a flow of the fluid.

2. The vortex generator of claim 1, wherein the sub pressure is sufficient to suck in surrounding fluid surrounding the outside of said vortex chamber, whereby the vortex generator operates as a pump or propulsion device.

3. The vortex generator of claim 1, wherein in operation a gas is introduced into the inlet portion along with the fluid which is a liquid, whereby the gas is subject to the fluid vortex at the inlet portion, causing bubbles of the gas to be present in the fluid at the outlet.

4. The vortex generator of claim 1, wherein in operation a liquid is introduced into the inlet portion along with the fluid which is a gas, whereby the liquid is subject to the fluid vortex at the inlet portion, causing drops of the liquid to be present in the fluid at the outlet.

* * * * *